(12) United States Patent
Fortson et al.

(10) Patent No.: US 9,518,429 B2
(45) Date of Patent: Dec. 13, 2016

(54) WALKING DRILLING RIG

(71) Applicant: Independence Contract Drilling, Inc., Houston, TX (US)

(72) Inventors: Fred Fortson, Houston, TX (US); David Brown, Houston, TX (US)

(73) Assignee: Independence Contract Drilling, Inc., Houston, TX (US)

( * ) Notice: Subject to any disclaimer, the term of this patent is extended or adjusted under 35 U.S.C. 154(b) by 535 days.

(21) Appl. No.: 14/069,217

(22) Filed: Oct. 31, 2013

(65) Prior Publication Data

US 2015/0114717 A1 Apr. 30, 2015

(51) Int. Cl.
*E21B 15/00* (2006.01)
*E21B 7/02* (2006.01)
*B62D 57/02* (2006.01)

(52) U.S. Cl.
CPC ........... *E21B 15/003* (2013.01); *B62D 57/022* (2013.01); *E21B 7/02* (2013.01)

(58) Field of Classification Search
CPC ........ E21B 15/003; E21B 7/02; B62D 57/032; B62D 57/022
USPC .................................... 180/8.5, 8.6
See application file for complete search history.

(56) References Cited

U.S. PATENT DOCUMENTS

| | | | | |
|---|---|---|---|---|
| 2,852,111 A * | 9/1958 | Fuller | ..................... | E21B 15/00 52/115 |
| 3,033,527 A * | 5/1962 | Wilson | ..................... | E21B 15/00 254/323 |
| 3,650,339 A * | 3/1972 | Selfe | ....................... | E21B 19/14 173/196 |
| 3,921,739 A * | 11/1975 | Rich | ..................... | E21B 15/003 180/313 |
| 5,921,336 A * | 7/1999 | Reed | ..................... | B62D 57/00 180/8.1 |
| 6,581,525 B2 * | 6/2003 | Smith | .................... | B62D 55/00 104/96 |
| 6,634,436 B1 * | 10/2003 | Desai | ...................... | E21B 15/00 173/1 |
| 8,925,658 B2 * | 1/2015 | Bryant | .................. | E21F 13/006 180/6.48 |
| 9,073,588 B1 * | 7/2015 | Squires | ................ | B62D 57/032 |
| 9,132,871 B2 * | 9/2015 | Crisp | ..................... | B62D 57/02 |
| 9,168,962 B2 * | 10/2015 | Trevithick | ............. | B62D 57/02 |
| 2003/0172599 A1 * | 9/2003 | Frink | ................... | E21B 15/003 52/116 |

(Continued)

OTHER PUBLICATIONS

National Oilwell Varco: "Rapid Rig" Brochure, Copyright 2012, 1 pg.

*Primary Examiner* — Shane Bomar
(74) *Attorney, Agent, or Firm* — Gardere Wynne Sewell LLP

(57) ABSTRACT

An improved walking drilling rig is disclosed. The walking drilling rig includes a preassembled substructure that includes a first skid beam disposed parallel and spaced apart from a second skid beam. A plurality of crossbeams couple the first skid beam to the second skid beam, and a plurality of extendable legs are supported by the first and second skid beams. An elevatable drill floor is coupled to the plurality of extendable legs and includes a rotary table disposed between a pair of lateral platforms. Each lateral platform has a retracted position and an extended position.

13 Claims, 13 Drawing Sheets

(56) References Cited

U.S. PATENT DOCUMENTS

2010/0038088 A1\* 2/2010 Springett .............. E21B 15/003
                                                              166/313
2012/0304553 A1   12/2012 Konduc et al.

\* cited by examiner

WALKING DRILLING RIG

TECHNICAL FIELD

This disclosure relates to equipment for use on well pads of a drilling rig, and more particularly, to a walking drilling rig where certain rig up operations are automatic and the walking functionality of the drilling rig is improved.

BACKGROUND OF THE DISCLOSURE

Multiple wells are often drilled on a single well pad. The same drilling rig may be used to drill and/or service multiple wells on a well pad. For example, the same drilling rig may drill each of three wells spaced apart approximately 25 feet on a well pad. To drill the wells, the drilling rig drills a surface section, which may be about 1000 feet deep. After drilling the surface portion, the drilling mud is changed to allow the drilling rig to drill the intermediate section, which may have a depth of 1000-6000 feet. After drilling the intermediate section, the drilling mud is once again changed to allow the drilling rig to drill the completion portion. The completion portion may be 6000 or more feet deep and may include 1000 or more feet of horizontal drilling.

In such a multi-well program it is common to assemble the drilling rig on the well pad, drill the surface section of the first well, then use hydraulically actuated shoes to walk 25 feet over to the next well and drill that surface section, without changing the drilling mud. In this manner, three surface portions may be drilled sequentially without requiring a change of the drilling mud. Once the three surface sections are drilled, the drilling mud can be changed, and the three intermediate sections can be drilled sequentially. The same drilling procedure may be used for the completion section of all three wells.

Conventional walking drilling rigs rely on unfolding electrical and flow lines in connection with walking of the drilling rig because certain equipment associated with the electrical and flow lines does not move with the drilling rig. In addition, the rig up or assembly of a drilling rig is inefficient because important components are transported on separate vehicles and are assembled manually at the well pad. For example, oftentimes the components that make up a drilling rig's substructure are shipped on three separate trucks and must be assembled on the well pad. A substructure typically includes a base, legs that are supported by the base, and a drill floor that is supported by the legs. Workers are often elevated to near drilling height to perform the manual assembly. Once assembled, substantial disassembly may be required to facilitate walking of the drilling rig. Once the drilling rig has walked to the next well, the disassembled components must be reassembled for the drilling rig to be fully operational to drill and/or service the next well.

SUMMARY

Accordingly, these and other issues are addressed by the improvements hereinafter described that utilize the teachings of the present disclosure. In a first aspect, a preassembled substructure of a walking drilling rig includes a first skid beam disposed parallel and spaced apart from a second skid beam. A plurality of crossbeams couple the first skid beam to the second skid beam, and a plurality of extendable legs are supported by the first and second skid beams. An elevateable drill floor is coupled to the plurality of extendable legs and includes a rotary table disposed between a pair of lateral platforms. Each lateral platform has a retracted position and an extended position.

According to certain embodiments, the substructure includes an integrated hydraulic power unit. The integrated hydraulic power unit is operable to actuate a plurality of walking shoes that are coupled to the substructure. The walking shoes allow the drilling rig to walk from one well to another on the same well pad. The substructure is configured to walk over a wellhead.

In a second aspect of the disclosure, a walking drilling rig includes a preassembled substructure that includes a first skid beam disposed parallel and spaced apart from a second skid beam. A plurality of crossbeams couple the first skid beam to the second skid beam, and the skid beams support a plurality of legs. The substructure also includes an integrated hydraulic power unit. The legs support an elevated drill floor, which includes a rotary table disposed between a pair of lateral platforms. Each lateral platform is hydraulically extendable from a retracted position to an extended position. The walking drilling rig also includes a plurality of hydraulic walking shoes that are coupled to the preassembled substructure.

Certain technical advantages of the present disclosure include a walking drilling rig that conveniently and efficiently walks from well to well to support a multi-well drilling program. The walking drilling rig includes an integrated hydraulic power unit, which actuates the walking shoes and walks with the walking drilling rig. Walking of the drilling rig is improved because the drilling rig is configured to walk over a wellhead that extends out of the ground.

Other technical advantages include a preassembled substructure that incorporates a pair of retractable lateral platforms that allows the preassembled substructure to be transported and delivered to a well pad where the lateral platforms can be automatically extended to form a drilling floor. The substructure includes other features that allow rig up to be performed safely and efficiently.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE FIGURES

For a more complete understanding of the present invention and the advantages thereof, reference is now made to the following brief description, taken in connection with the accompanying drawings and detailed description, wherein like reference numerals represent like parts, in which.

DETAILED DESCRIPTION

Figure 1:
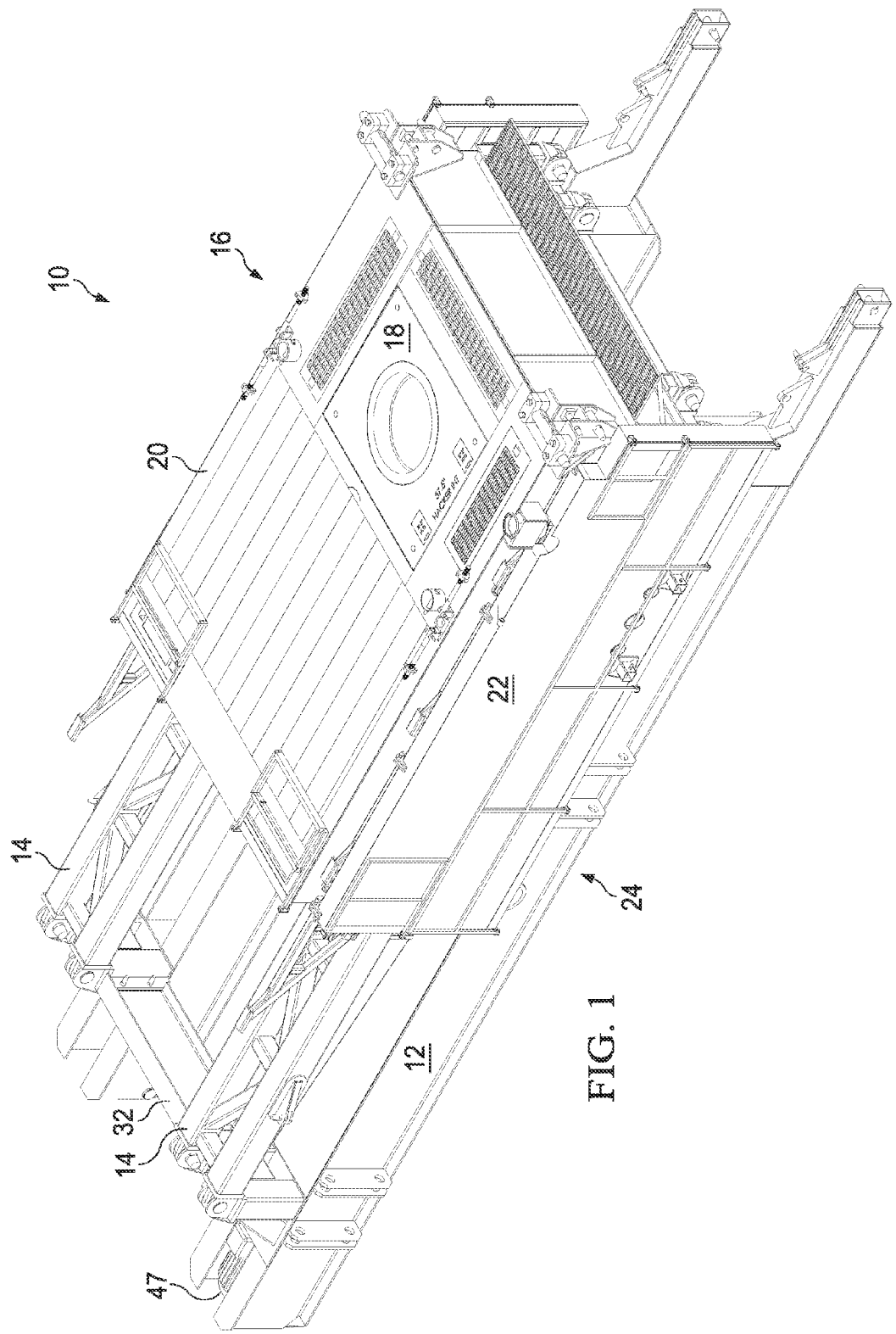
FIG. 1 is an isometric view of a substructure of a walking drilling rig in accordance with this disclosure.

Referring to FIG. 1, a substructure 10 for a walking drilling rig is shown. The substructure 10 may be delivered to a drilling pad preassembled as shown. The substructure 10 supports a 1500 horsepower drilling rig with a mast height of 130-150 feet. In one embodiment, the substructure 10 supports a mast with a height of approximately 143 feet. The preassembled substructure 10 includes a base assembly 24 including a pair of skid beams 12 disposed parallel to each other on each side of the base assembly 24. The skid beams 12 support four hydraulically extendable legs 14 (two shown). The preassembled substructure 10 also includes a drill floor 16 that may be elevated to a drilling height of approximately 26 feet by the extendable legs 14. The drill floor includes a rotary table 18 and a setback area 20. In addition, the drill floor 16 includes a pair of lateral platforms 22 that are hydraulically extendable from the shown retracted position to the extended position shown in FIG. 3.

With the pair of lateral platforms 22 in the retracted position, the overall width of the preassembled substructure 10 is reduced to less than about 16 feet. In certain embodiments, the overall width of the substructure 10 may be greater than 13 feet and less 16 feet. The reduced width allows the preassembled substructure 10 to be transported by a trailer that is approximately ten feet wide and delivered preassembled to a well pad. Furthermore, the height of the substructure 10 in the collapsed configuration shown is approximately 8 feet, which is approximately 5 feet lower than a transport height of the mast and approximately 3 feet lower than a transport height of the driller's cabin. Reducing the collapsed height is beneficial because the reduced height substructure 10 can be transported by the trailer without requiring a special travel route that ensures overpass clearance, if any, of the transported substructure. With conventional drilling rig substructures, it is common for the drilling floor component of the substructure to be shipped separately from other components of the substructure so as to reduce the overall height of the load being transported. However, according to the teachings of the present disclosure, the preassembled substructure 10 can be transported in a single load, and thereby can save valuable rig-up time that would otherwise be spent assembling components of a drilling rig that are transported to the well pad on separate trailers. The preassembled substructure 10 can be unloaded from a trailer as shown, assembled with walking shoes (as described in more detail below), then walked into drilling position without substantially substructure assembly being required before the drilling rig is able to walk.

The substructure 10 includes a pair of lateral platforms 22. The lateral platforms 22 are shown in their retracted position folded downward toward the skid beams 12 of the substructure 10. The lateral platforms 22 are hydraulically raised using either an integrated hydraulic power unit (HPU) or an external HPU. Either HPU may be operated by a remote control to allow an operator to walk around the rig to observe that the lateral platforms extend properly. If the operator observes an error or fault in the extension operation, he can use the remote control to communicate with the HPU and halt the extension operation.

Figure 2A:
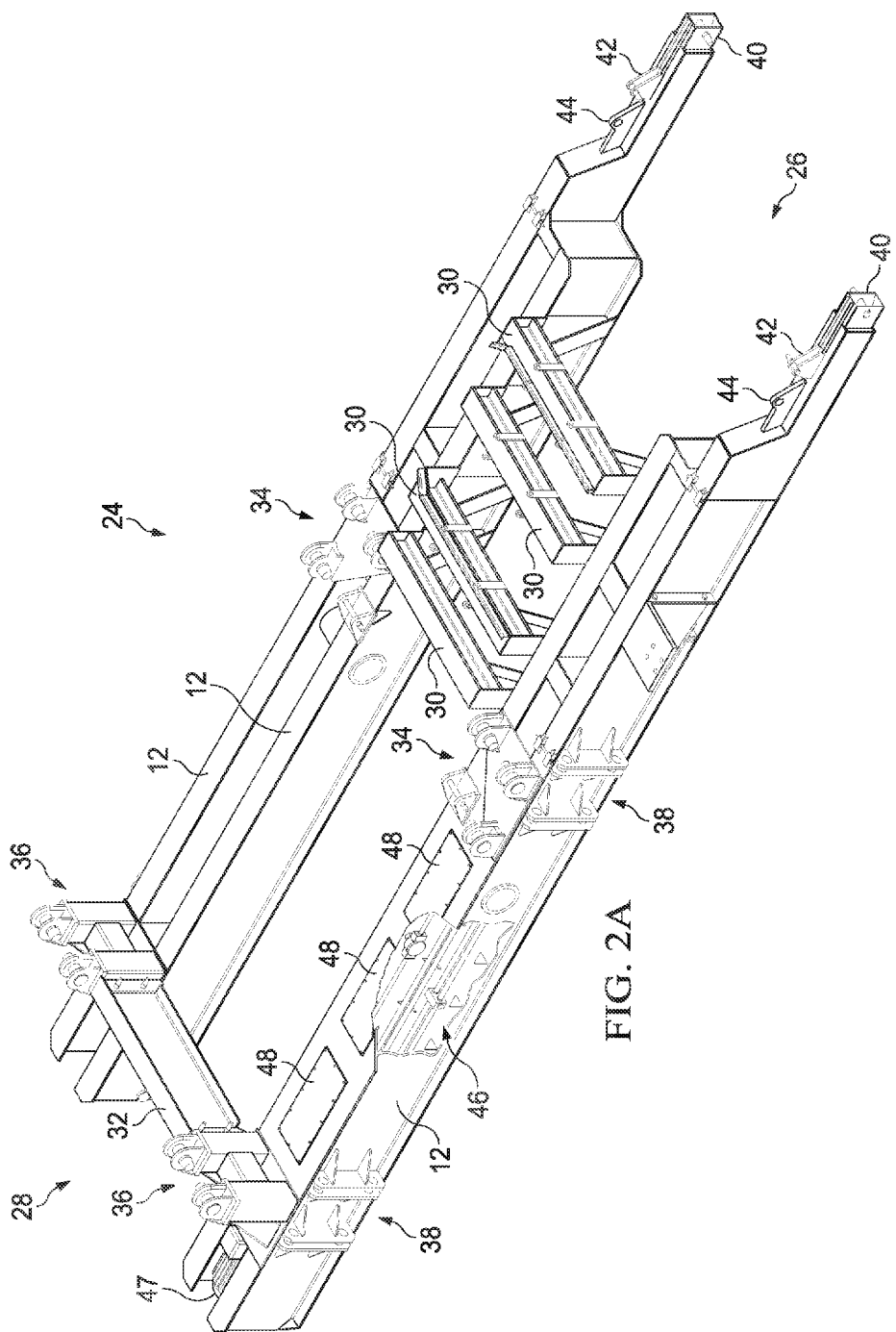
FIGS. 2A and 2B are isometric views of a base assembly of the substructure shown in FIG. 1.
Figure 2B:
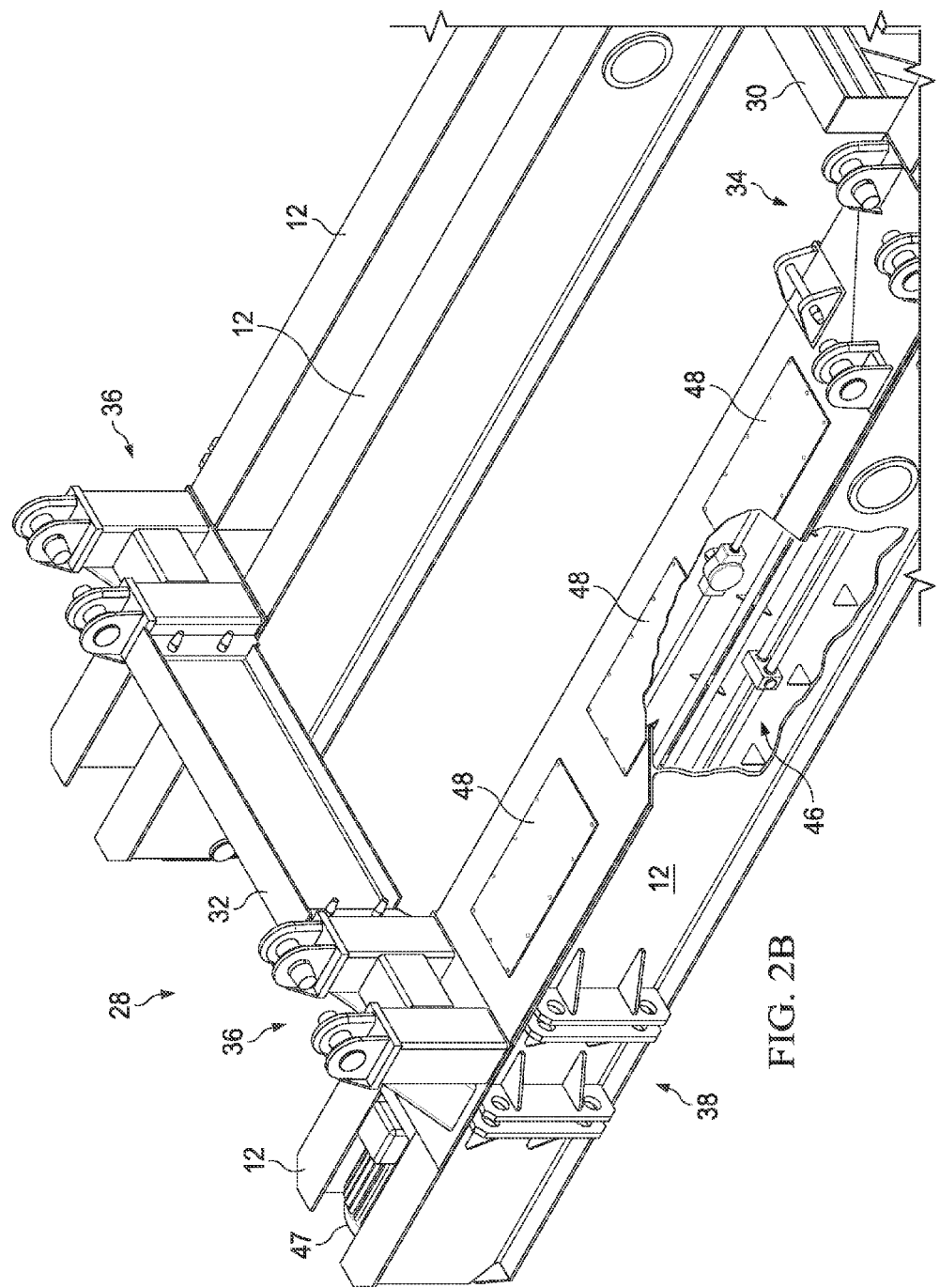

Referring now to FIG. 2, which is an isometric view of the base assembly 24. The base assembly 24 includes two pairs of skid beams 12 with each pair disposed parallel to each other and connected by a plurality of cross beams 30. The pairs of skid beams 12 are spaced apart from each other far enough to accommodate a blow-out preventer disposed between the two pairs of skid beams 12. The outer beams of each pair of skid beams 12 may be approximately 13 feet apart from each other. The base assembly 24 generally defines a drawworks end 26 and a V-door end 28. In the illustrated embodiment, four cross beams 30 are disposed at the drawworks end 26 of the base assembly 24. The cross beams 30 serve to join the pairs of skid beams 12 together and stabilize the drilling rig during walking. Because the substructure 10 is preassembled, the crossbeams 30 may be welded or otherwise permanently secured to each pair of skid beams 12. In addition, the crossbeams 30 function as side load braces and support the drawworks at an elevated height and allow the drawworks to walk with the rest of the drilling rig. A removable beam 32 is disposed at a V-door end 28 of the base assembly 24. The removable beam 32 may be temporarily removed to accommodate a drilling operation that employs a blow-out preventer.

The configuration of the base assembly 24 allows the walking drilling rig to walk over a wellhead. For example, the skid beams 12 define a generally open space through the bottom of the rig. The cross beams 30 and the removable beam 32 are elevated such that a well head can pass underneath them. In certain embodiments, a bottom surface of the lowest cross beam may provide ground clearance of up to four feed. In the illustrated embodiment, the ground clearance height of the crossbeams is approximately three feet and five inches. This ground clearance allows the walking drilling rig to walk over a well head extending approximately four feet out of the ground.

The skid beams 12 provide support for a pair of drawworks side leg mounts 34 and a pair of V-door side leg mounts 36. The leg mounts allow the base of the legs 14 to be attached to the base assembly 10. In addition, the leg mounts 34, 36 allow the legs to rotate approximately 90 degrees from a retracted to an extended position and be locked in the extended position. With the legs 14 in the extended position, the drilling floor 16 is elevated to the drilling height of approximately 26 feet. The skid beams also include two pairs of hydraulic walking shoe mounts 38, one pair disposed on each side of the base assembly 24. The base assembly also includes mudboat mounts 40, mast cylinder mounts 42, and mast ramp mounts 44.

The base assembly 24 also houses an integrated hydraulic power unit 46. In particular, the integrated HPU 46 is housed between one pair of skid beams 12. One or more access hatches 48 provide access to the integrated HPU 46 and its associated tanks. The hatches 48 provide access to a 600 gallon hydraulic tank disposed within a pair of skin beams 12. The integrated HPU 46 includes a diesel or electric motor 47, one or more pumps, a cooling fan, hoses and other conduits, and other components that are known in the hydraulic power art. In one embodiment, the motor 47 is operable to deliver approximately 100 horsepower.

By integrating the HPU 46 into the base assembly, the walking shoes may be powered by the integrated HPU, which allows the integrated HPU 46 to walk with the drilling rig. The integrated HPU 46 is a substantial improvement over prior art walking rigs that rely on external HPUs that have to be moved separate and independently of the walking rig. Such external HPUs require hydraulic and electrical conduit to couple the external HPU to the walking drilling rig. This hydraulic and electrical conduit often inconveniently runs over the ground of the well pad.

The integrated HPU 46 may also be used to power the hydraulic cylinders used during rig up. For example, the integrated HPU 46 may be used to power the hydraulic cylinders that raise the lateral platforms 22 and/or the cylinders that raise the legs 14. Alternatively or in addition to the integrated HPU, an external HPU (not shown) may be used to power the hydraulic cylinders for the rig up. The external power unit may have a higher power capacity than the integrated HPU 46 and may be powered by a diesel engine. The integrated HPU 46 and the external HPU also serve to be redundant of each other.

Figure 3:
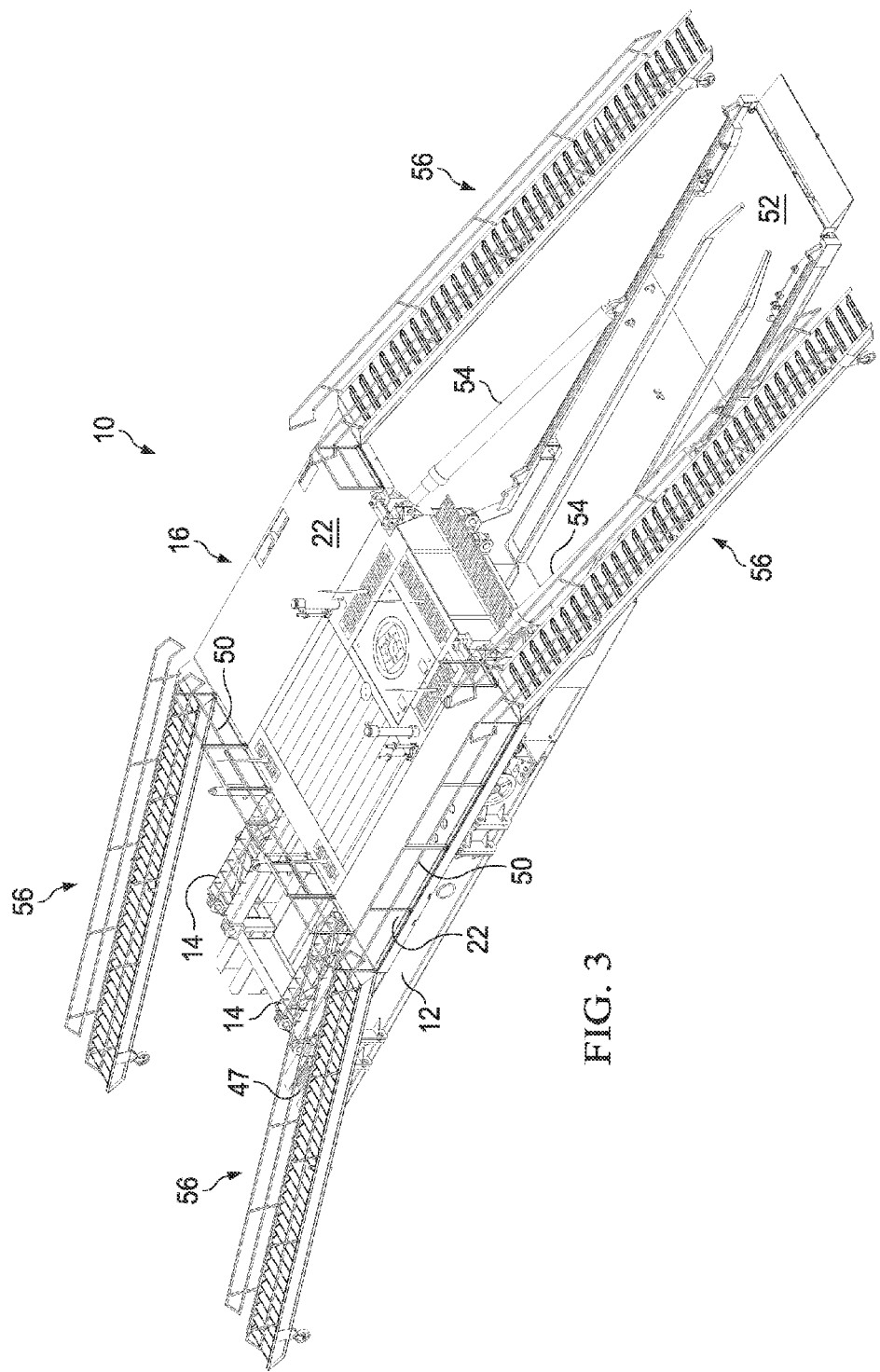
FIG. 3 is an isometric view of the substructure of FIG. 1 shown in an early stage of a rig up procedure according to the teachings of the present disclosure.

Either the integrated HPU 46 or the external HPU may be used to extend the lateral platforms 22 as shown in FIG. 3, which illustrates an initial phase of rig up. Removable hydraulic cylinders (not shown) powered by one of the two HPUs extend the cantilever-style lateral platforms 22 from their retracted position to their extended position. Once extended, a plurality of hydraulically actuated trusses are rotated from a retracted position to an extended position to support the extended lateral platforms 22. In certain embodiments, one extended lateral platform may be supported by four trusses. As previously described, the hydraulics that extend the lateral platforms 22 and the supporting trusses may be actuated by an operator using a remote control In this manner, the operator can observe the extension operation from multiple perspectives as he walks around the substructure 10 with the remote control. Safety rails 50 are also manually unfolded into their upright positions.

A mudboat 52 is attached to the base assembly 24 at the mudboat connectors 40. The mudboat 52 provides support for a pair of hydraulic cylinders 54. The hydraulic cylinders 52 may be used to assist in raising the substructure 10 to drilling height and may also be used to raise the mast, as discussed in more detail below with respect to FIGS. 10 and 11. In addition, access stairs 56 are attached to the extended lateral platforms 22 to provide workers access to the drill floor.

Figure 4A:
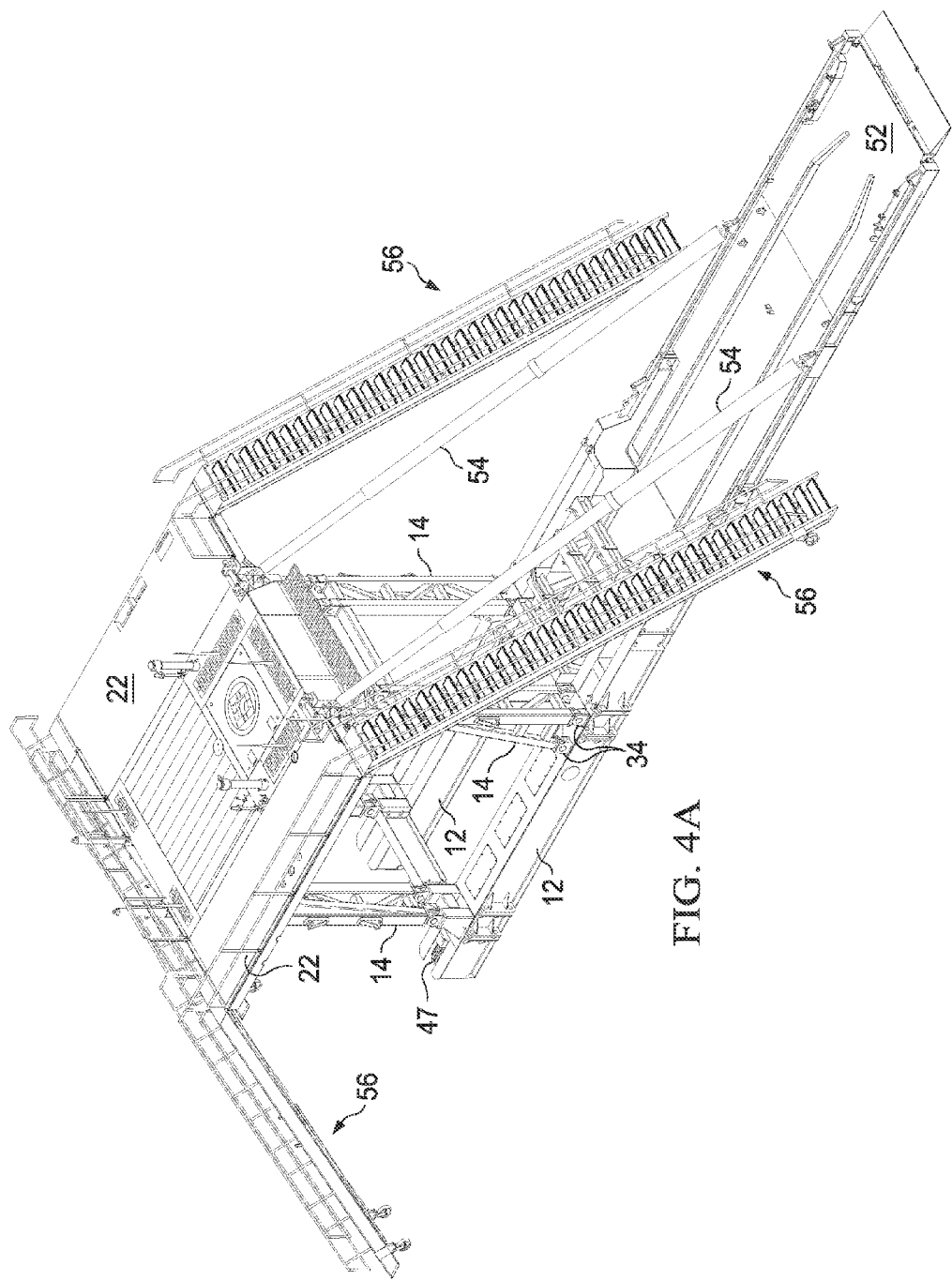
FIG. 4A is an isometric view of the substructure of FIG. 1 shown in a stage of a rig up procedure where the drilling floor is elevated to a drilling height according to the teachings of the present disclosure.

FIG. 4A illustrates the substructure 10 with the drill floor 16 raised to drilling height, which may be approximately 26 feet. The legs 14 are hydraulically rotated from their retracted position into their extended position, which causes the drill floor 16 to be elevated. In the embodiment shown, the hydraulic cylinders 54 may be used to assist other removable hydraulics in elevating the drill floor 16. In other embodiments, the legs 14 may be extended without using the hydraulic cylinders 54 shown but are extended using other removable hydraulic devices that are known in the art. Once rotated into an upright position, the legs 14 are locked in place using a pin-type lock or any suitable locking mechanism.

Figure 4B:
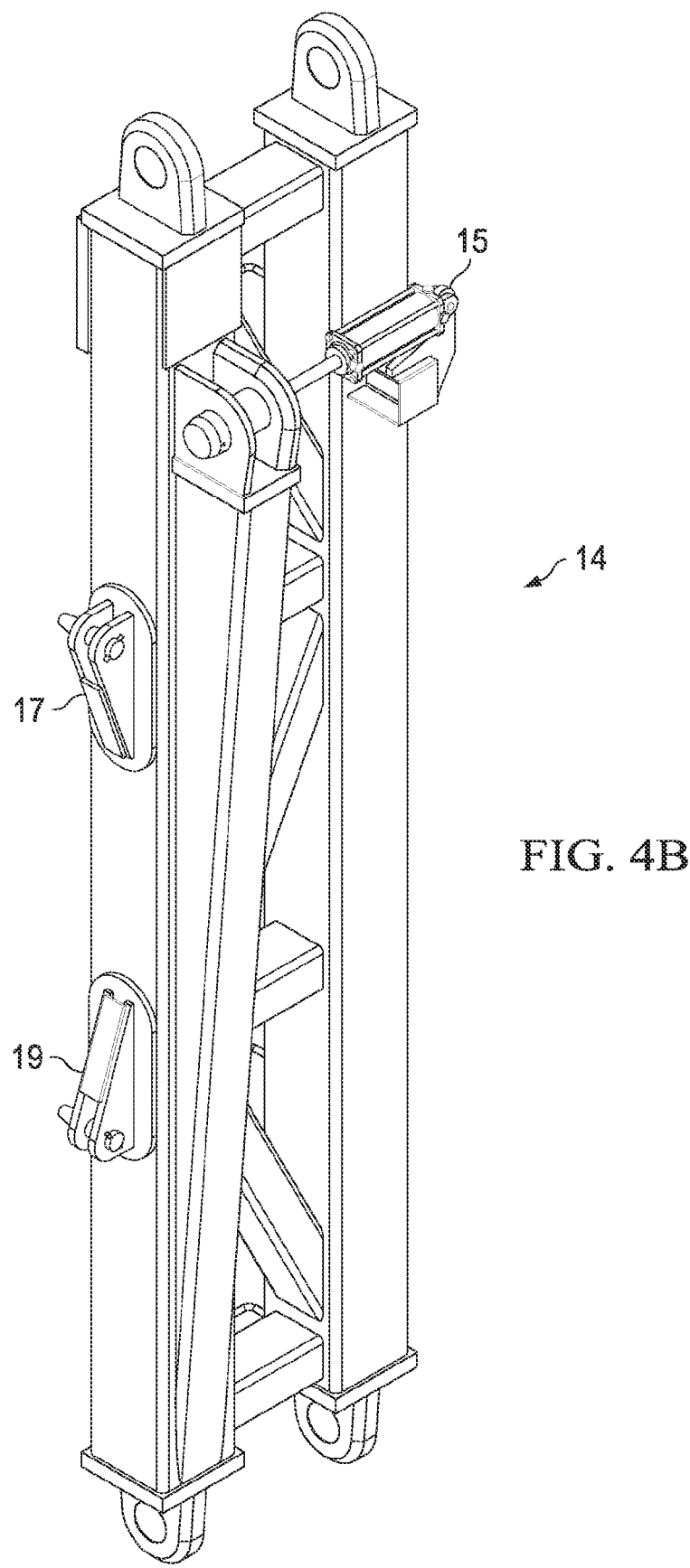
FIG. 4B is an isometric view of one of the V-door side legs.

The drawworks side legs 14 are locked upright by a pin that is inserted at the base of the legs 14 through the drawworks side leg mounts 34. The V-door side legs 14 are locked upright by a pin that is inserted near the top of the legs 14. FIG. 4B is an isometric view of the V-door side leg 14 on the off driller side of the drilling rig. A locking pin actuator 15 is disposed near the top of the legs 14 and is hydraulically actuated using the integrated HPU 46 to lock the legs 14 in their extended, upright position. The hydraulically actuated leg locking pin 15 is an improvement over manual leg locking mechanisms found on conventional drilling rig because the legs 14 may be locked upright without requiring a worker to be elevated approximately 20 feet to insert a locking pin manually. In certain embodiments, a diagonal brace may be manually secured to a brace mount 17 supported by the extended legs 14. The diagonal brace provides additional support for the cantilevered lateral platforms 22. The legs 14 also support a walking shoe strut mount 19. As shown in FIGS. 7-11, each walking shoe is connected to a respective leg 14 by a strut 21 that extends diagonally from the top of the walking shoe and is secured to the leg 14 at the walking shoe strut mount 19.

The top of the access stairs 56 raises with the drill floor 16 and the bottom of the access stairs 56 move on wheels toward the base assembly 24. Similar to the extension of the lateral platforms 22, an operator uses a remote control in communication with either the integrated HPU or an external HPU to elevate the drill floor. As such, the operator of the remote control may observe the elevation of the drill floor from multiple vantage points.

Figure 5:
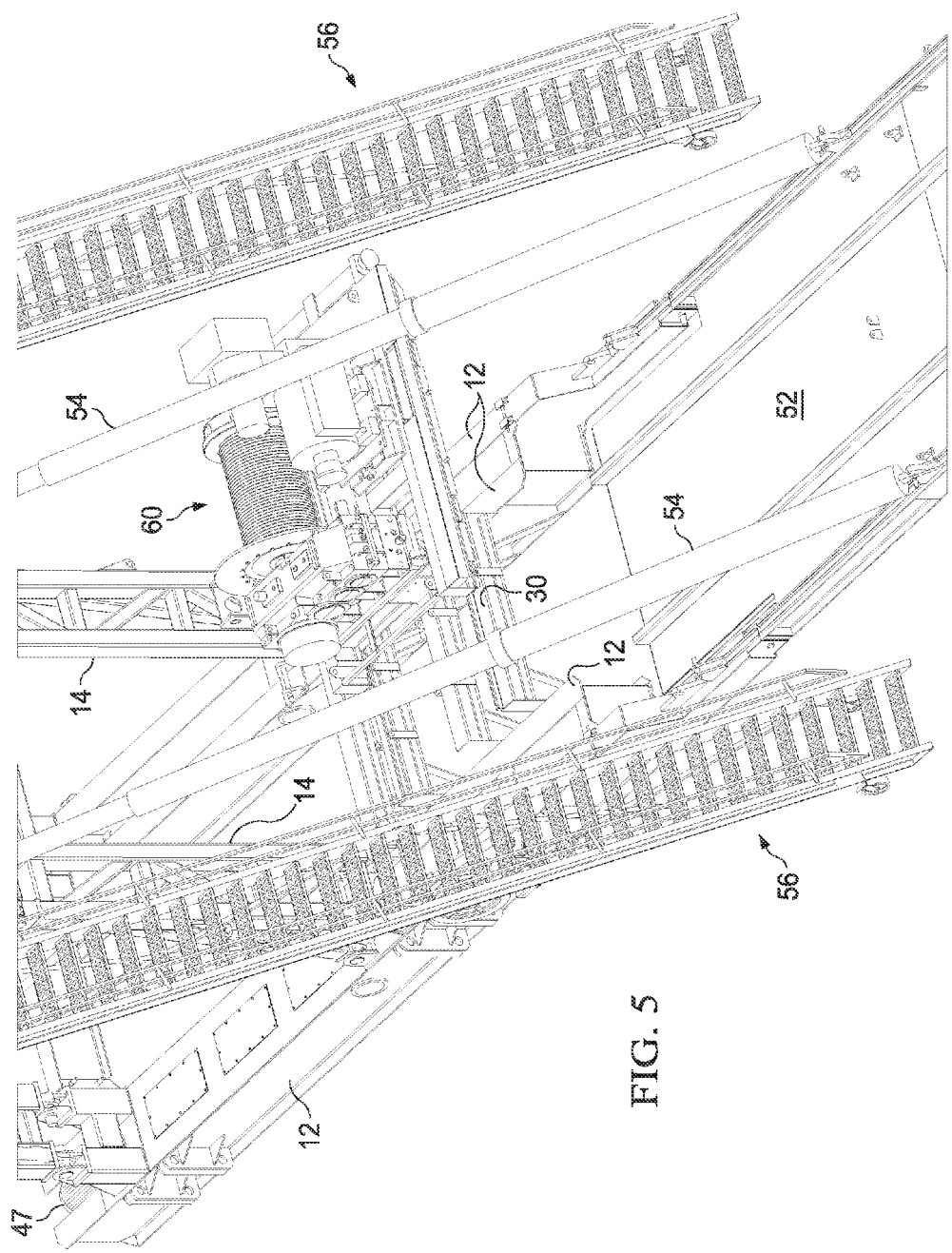
FIG. 5 is detailed isometric view of the attachment of drawworks to the substructure according to the teachings of this disclosure.
Figure 6:
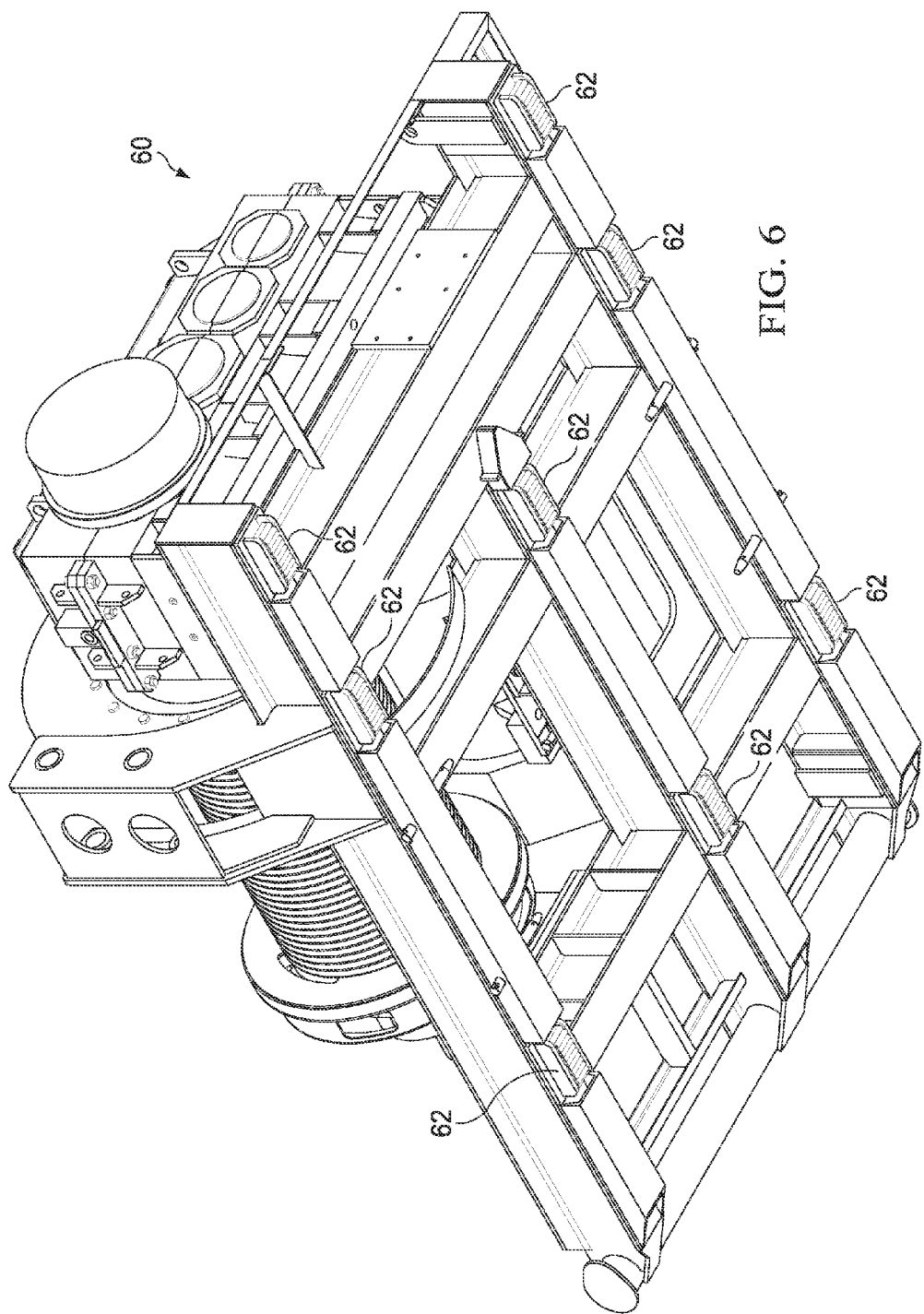
FIG. 6 is an isometric view of the underside of the drawworks shown in FIG. 5.

After elevating the drilling floor 16 to drilling height, the drawworks 60 is received by the substructure 10, as shown in FIG. 5. The drawworks 60 is positioned in front of the drawworks side legs 14 after the legs 14 have been raised to their upright position. A trailer or other rig up vehicle positions the drawworks 60. The drawworks 60 may be moved on its rollers 62 from the trailer to be supported by the crossbeams 30. FIG. 6 is a view of the underside of the drawworks 60 showing the rollers, which allow the drawworks 60 to be easily positioned to be supported by the crossbeams 30.

Referring back to FIG. 5, a top portion of the crossbeams 30 is at a tailboard height of a rig up truck, which allows the drawworks 60 to be rolled from the tailboard directly onto the crossbeams 30. In this manner, the drawworks 60 can be secured to the substructure 10 without the use of a crane as is common in rig up procedures of conventional drilling rigs.

By supporting the drawworks 60 with the crossbeams 30 of the base assembly 24, as opposed to the mudboat 52, as is common with conventional drilling rigs, the mudboat 52 can be separated from the rest of the drilling rig, which allows the drilling rig more freedom in walking. Thus, the drawworks 60 and the drill line spooler walk with the drilling rig, which prevents drilling line and other conduit and lines from having to be laid out on the well pad as the drilling rig walks. In addition, as previously mentioned, the drawworks 60 is elevated by the cross beams 30 to allow the drilling rig to walk over a four foot wellhead.

Figure 7:
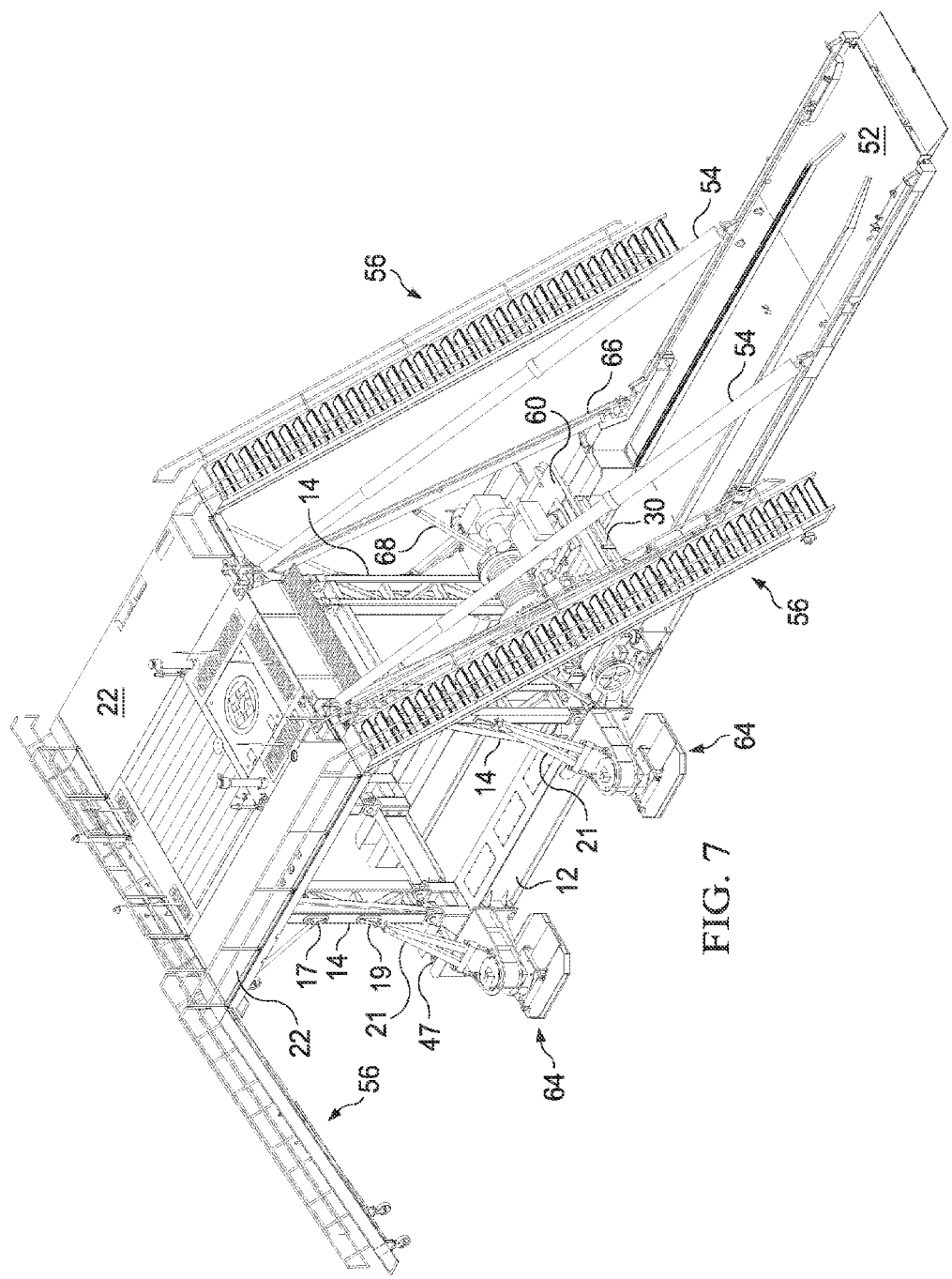
FIG. 7 is an isometric view of the substructure including walking shoes to facilitate walking of the walking drilling rig according to the teachings of the present disclosure.

Reference is made to FIG. 7, which illustrates a subsequent stage of the rig up procedure. In the embodiment shown, the base assembly 24 supports two pairs of walking shoes 64. More specifically, the walking shoes 64 are connected to the walking shoe mounts 38 on the skid beams 12. Unlike conventional walking rigs that have walking shoes disposed generally proximate the corners of the base support structure, the walking shoes 64 are disposed to be aligned with the legs 14 of the substructure 10. In this manner, the walking shoes 64 are placed directly underneath the legs 16, which bear the weight of the elevated drill floor 16 and the drilling equipment, including the mast that is supported by the drill floor 16. The placement of the walking shoes 64 generally at the base of the legs 14 also allows the pairs of skid beams 12 to be closer to each other, which reduces the overall width of the substructure 10.

The walking shoes use hydraulics to raise the entire drilling rig including the mast and move it short distances on the well pad. The walking shoes 64 can move the rig forward, backward, right, left, and at least four diagonal directions such that the drilling rig is movable in at least eight directions. The walking shoes 64 will move the drilling rig in the direction of the horizontal hydraulic cylinder of the walking shoes 64. Each walking shoe 64 is manually rotatable. Thus, to move the drilling rig in a diagonal direction, each walking shoe 64 is manually rotated either clockwise or counterclockwise approximately 45 degrees and a pin is inserted to secure the walking shoe at the rotated orientation. Assuming the walking shoes 64 are each rotated clockwise, the horizontal hydraulic cylinder of each walking shoe will be generally aligned with a diagonal direction between the V-door side and the driller side of the drilling rig. Moreover, the walking shoes 64 are operable independently of each other, which facilitates fine position adjustments and leveling of the drilling rig. This increased directional and leveling functionality allows the drilling rig to support an irregularly designed multi-well well pad.

The walking shoes 64 are used to walk the drilling rig short distances, for example 25 to 120 feet. In addition, the walking shoes 64 may be actuated to move the drilling rig as little as six inches. The walking shoes 64 are operable in at least two speeds. For example, when the mast of the drilling rig is not loaded, the walking shoes 64 may be moved at a slower speed than the rig is moved if the mast is loaded. In certain embodiments, the walking shoes 64 may move an unloaded rig twice as fast as the rig can be moved when the mast is loaded. Thus, drilling rig can be assembled over one well bore on a well pad, and can walk to service another well bore on the same well pad without having to disassemble the drilling rig and reassemble it over the well pad. The walking shoes may be controlled using a remote control that communicates with the integrated hydraulic power unit 46.

An electrical "grasshopper" (not shown) is integral to the movement of the walking rig and follows the movement of the drilling rig to support a variety of different well patterns.

FIG. 7 also shows mast ramps 66 and supports 68 for the mast ramps 66 in position to support the raising of the mast in subsequent stages of the rig up procedure.

Figure 8:
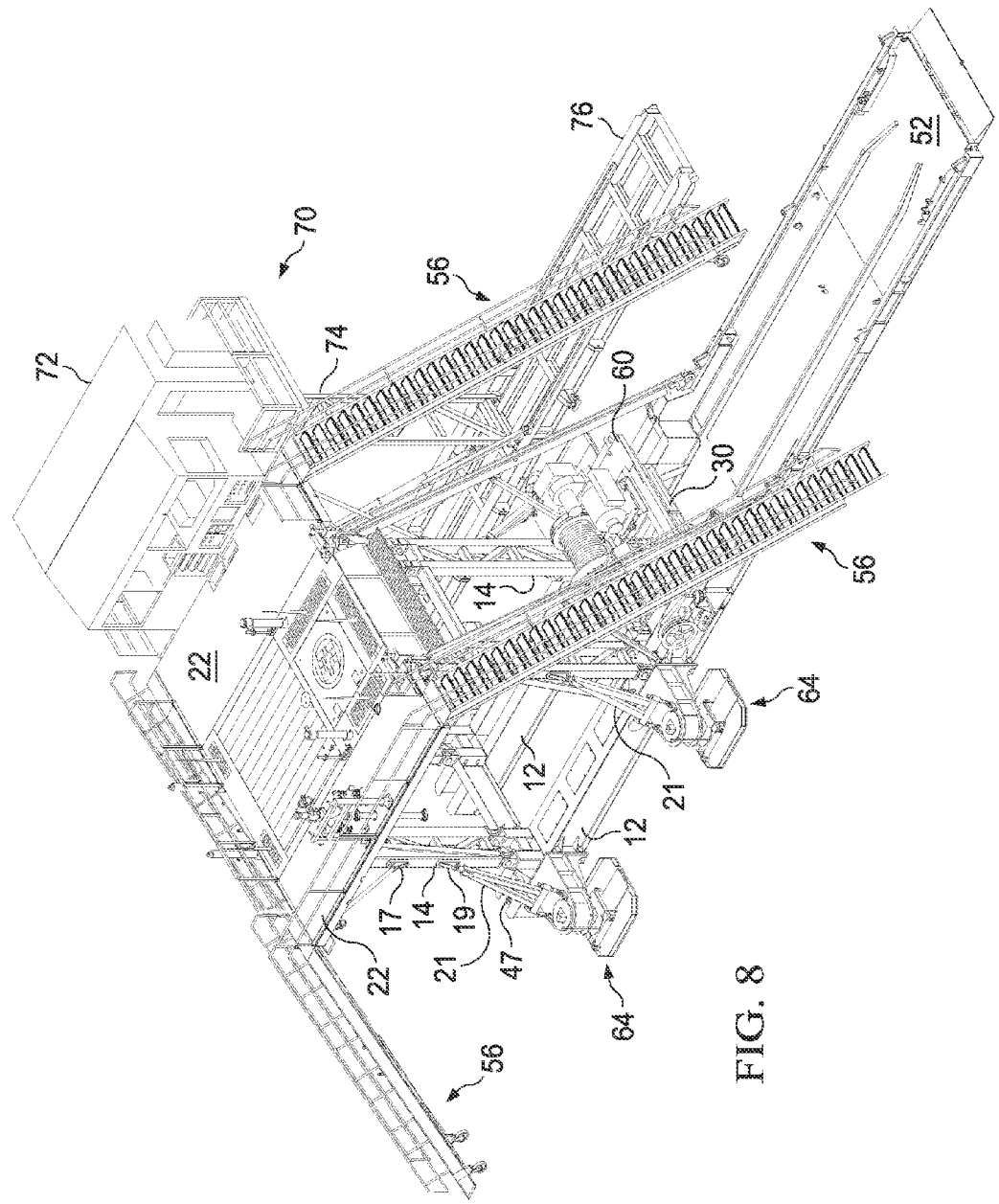
FIG. 8 is an isometric view of the substructure including a driller's cabin assembly according to embodiments of the present disclosure.

FIG. 8 shows a driller's cabin assembly 70 supporting a driller's cabin 72, which has been elevated to be level with the drill floor 16. The assembly 70 includes legs 74 and base 76. The legs 74 are similar in construction to the legs 14 of the substructure 10. The driller's cabin can be secured to one of the extended lateral platforms 22. The hydraulic walking shoes 64 can move the driller's cabin assembly 70 simultaneously with the rest of the drilling rig. Once again, because the drilling rig including the driller's cabin can be moved from well bore to well bore without requiring disassembly and reassembly, valuable rig up time is saved using the teachings of the present disclosure.

Also illustrated in FIG. 8 are the hydraulic cylinders 54. The hydraulic cylinders 54 are retracted and the bases of the hydraulic cylinders 54 are disposed at the front of the mudboat 52 to prepare for raising the mast.

Figure 9:
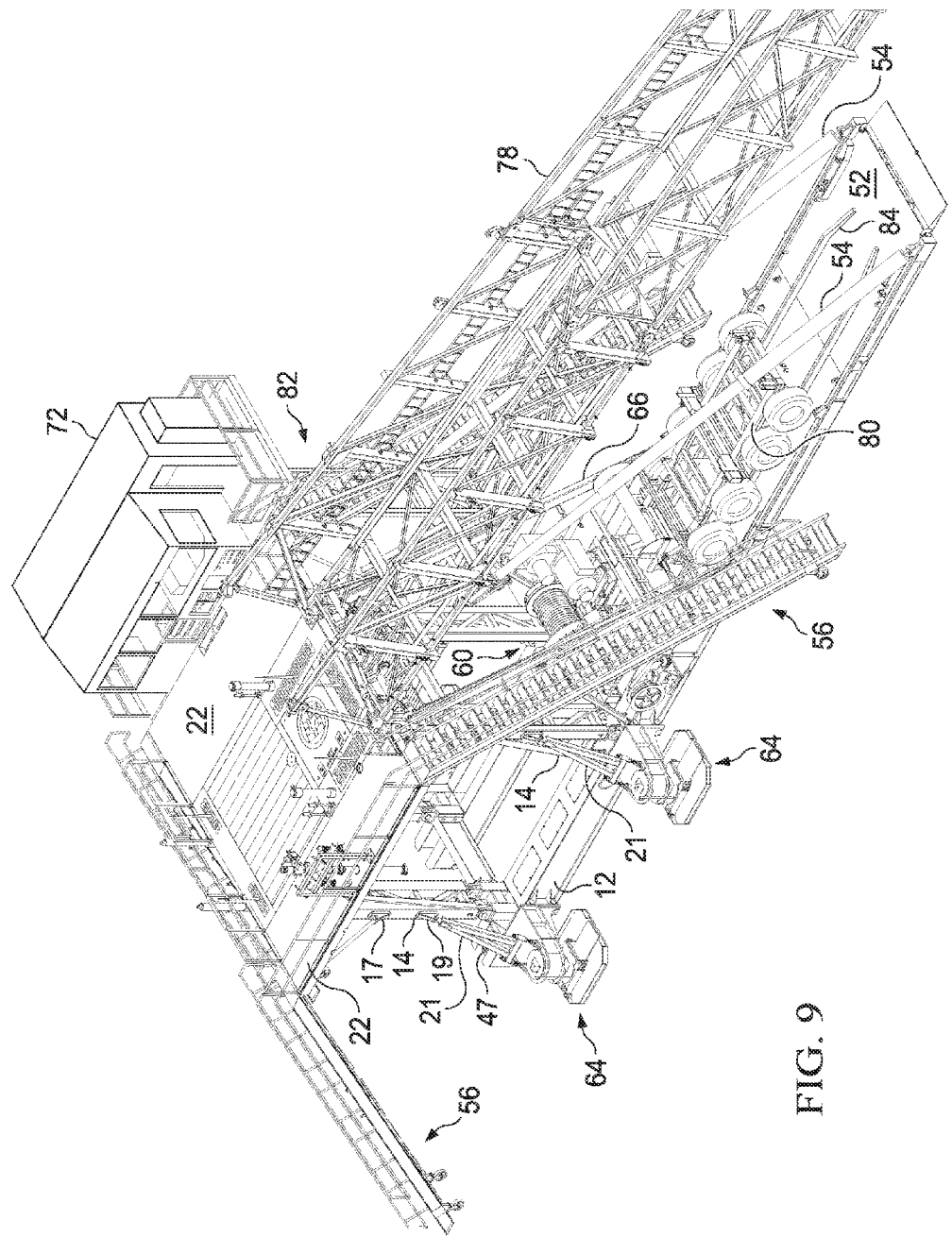
FIG. 9 is an isometric view of a walking drilling rig in a stage of a rig up procedure involving elevating a mast to be supported by a drilling floor.
Figure 10:
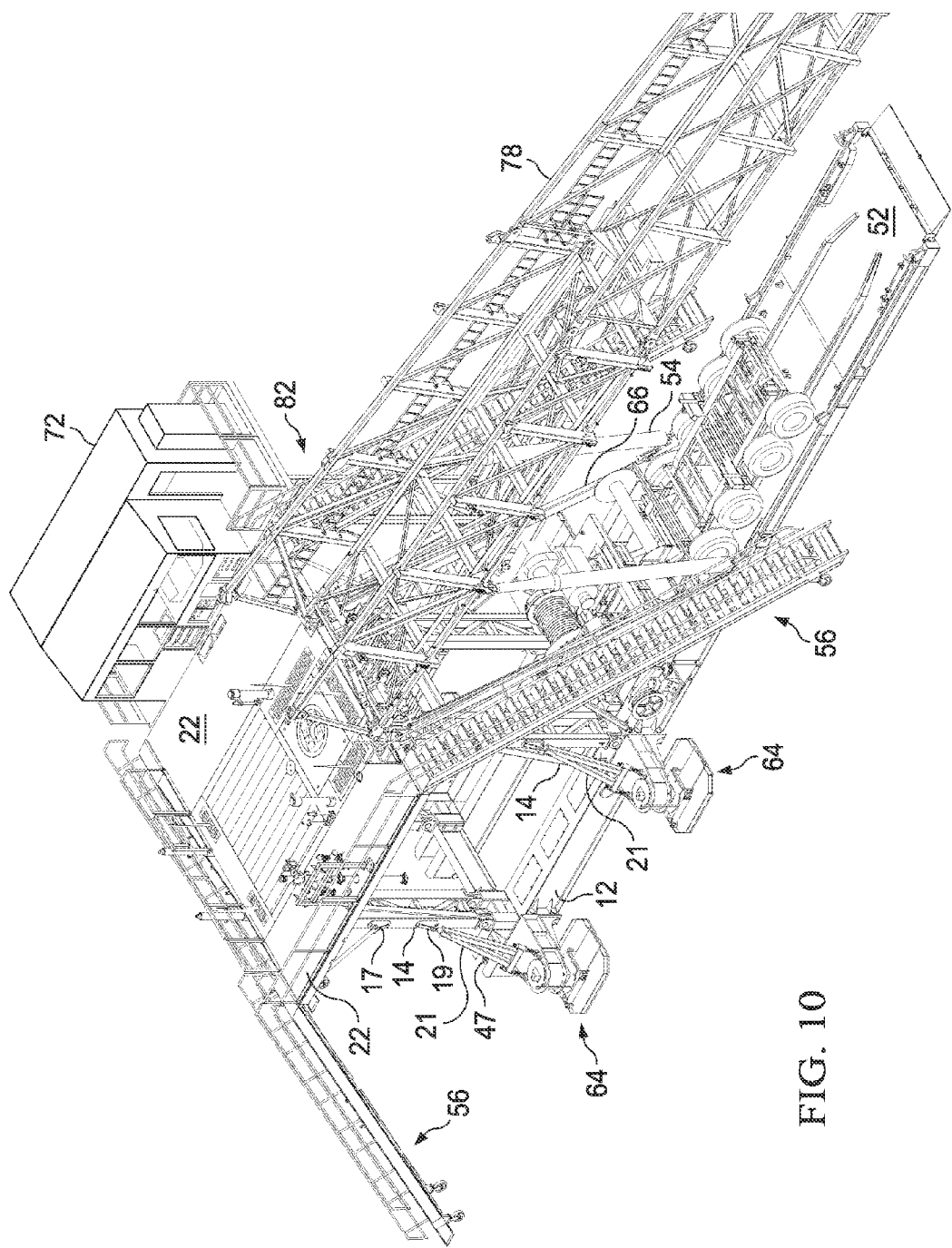
FIG. 10 is an isometric view of a walking drilling rig in a subsequent stage of a rig up procedure including elevating the mast to be supported by the drilling floor.

FIGS. 9 and 10 illustrate the drilling rig at sequential stages of raising a mast 78. First, a mast dolly 80 supporting a base end 82 of the mast 78 is received by the mudboat 52. The mudboat 52 includes guide rails 84 to guide the mast dolly 80 supporting the mast 78 in position to engage the mast ramps 66. The base end 82 of the mast 78 is elevated up the mast ramps 66 by extension of the hydraulic cylinders 54 at an appropriate angle. Note that the bases of the hydraulic cylinders 54 are secured to and end of the mudboat 52 to be in position to raise the base of the mast 78 up the mast ramp 66. FIG. 10 shows the base of the hydraulic cylinders moved more toward the substructure to be in position to tilt the mast and pivot it on part of its base such that the mast is fully supported by the substructure and is disposed aligned with the rotary table 18.

Figure 11:
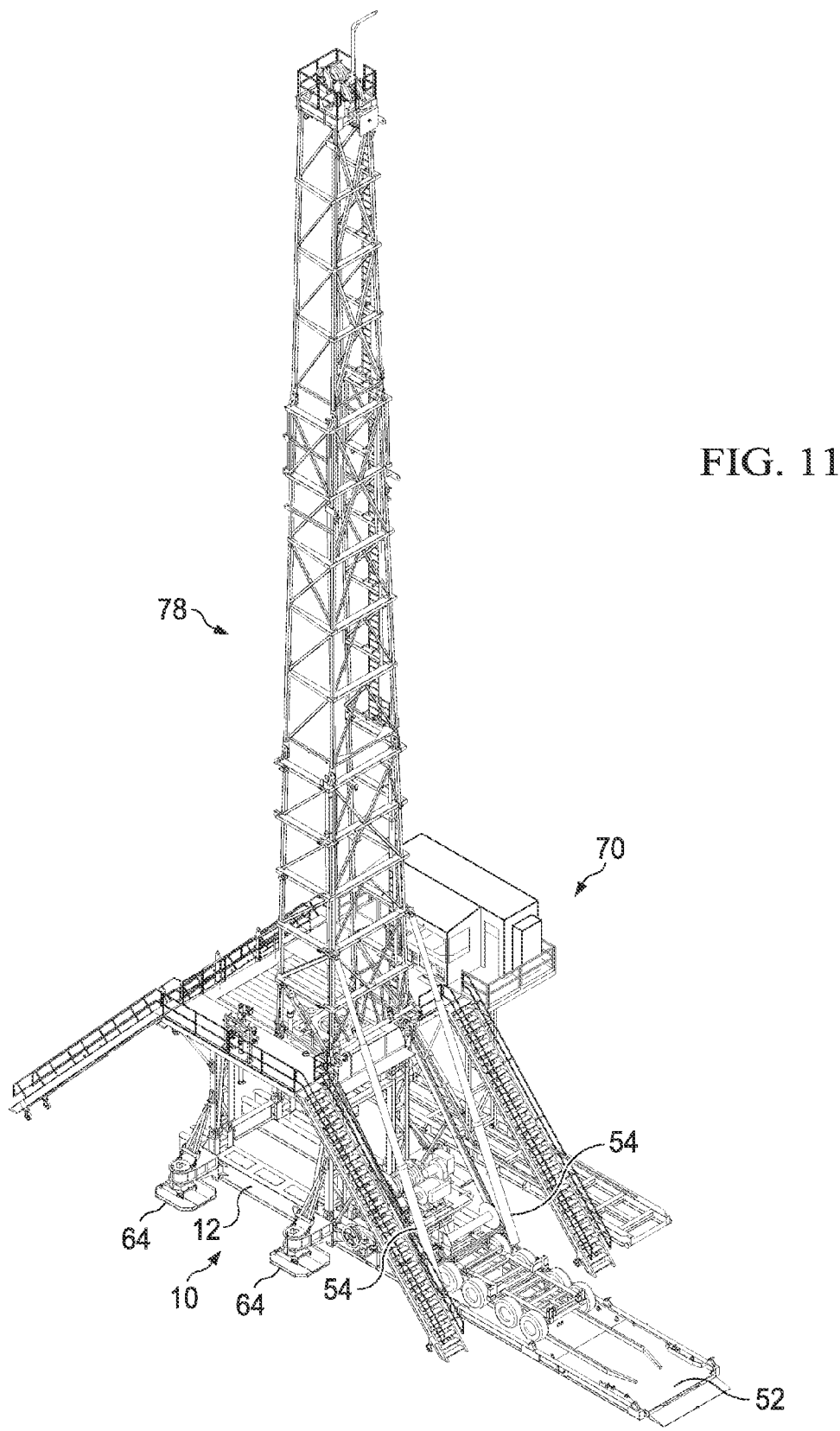
FIG. 11 is an isometric view of a walking drilling rig rigged up showing the mast in a drilling position supported by a drilling floor at a drilling height.

FIG. 11 shows the hydraulic cylinders 54 extended to tilt the mast up on its base. From this position, the hydraulic cylinders may be detached, the mudboat 52 may be detached and the drilling rig is rigged up and can soon be operational. In addition, the drilling rig can walk using the hydraulic walking shows from one well to another without disassembling the rig and reassembling it over the next well. In this manner, multi-well programs may be efficiently and quickly drilled and/or supported using the walking rig according to the teachings of the present disclosure.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right," "front" and "rear," "above" and "below" and the like are used as words of convenience to provide reference points and are not to be construed as limiting terms.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, the present invention has been described in connection with what are presently considered to be the most practical and preferred embodiments, but it is to be understood that the invention is not to be limited to the disclosed embodiments. On the contrary, the invention is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A walking drilling rig, comprising:
    a preassembled substructure comprising:
        a first skid beam disposed parallel and spaced apart from a second skid beam;
        a plurality of crossbeams coupling the first skid beam to the second skid beam;
        a plurality of legs supported by the first and second skid beams;
        an integrated hydraulic power unit; and
        an elevated drill floor coupled to the plurality of legs and comprising a rotary table disposed between a pair of lateral platforms, each lateral platform being hydraulically extendable from a retracted position to an extended position;
    a plurality of hydraulic walking shoes coupled to the preassembled substructure;

a mudboat coupled to the preassembled substructure;
a mast dolly supported by the mudboat and
a mast supported by the elevated drill floor.

2. The walking drilling rig of claim 1 wherein each hydraulic walking shoe is disposed proximate a leg of the plurality of legs, the integrated hydraulic power unit actuating the plurality of hydraulic walking shoes.

3. The walking drilling rig of claim 2 wherein the plurality of walking shoes comprises four walking shoes, each walking shoe configured to be independently actuated.

4. The walking drilling rig of claim 3 wherein each walking shoe is rotatable about a generally vertical axis.

5. The walking drilling rig of claim 1, further comprising a drawworks coupled to the preassembled substructure, and actuation of the hydraulic walking shoes enables movement of the walking drilling rig including the drawworks.

6. The walking drilling rig of claim 5 wherein the drawworks is supported by the plurality of crossbeams.

7. The walking drilling rig of claim 1 wherein the mast has a mast height of at least 140 feet.

8. The walking drilling rig of claim 1 wherein a portion of the walking drilling rig is configured to walk over a four foot wellhead.

9. The walking drilling rig of claim 1, further comprising a driller's cabin coupled to the preassembled substructure and aligned with the elevated drill floor, and actuation of the hydraulic walking shoes enabling movement of the walking drilling rig including the driller's cabin.

10. The walking drilling rig of claim 9 further comprising a base supporting at least one leg, the driller's cabin being supported by the at least one leg.

11. A method of rigging up a walking drilling rig, comprising:
    providing a preassembled substructure comprising:
        a first skid beam disposed parallel and spaced apart from a second skid beam;
        a plurality of crossbeams coupling the first skid beam to the second skid beam;
        a plurality of legs supported by the first and second skid beams;
        an integrated hydraulic power unit; and
        a drill floor supported by the plurality of legs and comprising a rotary table disposed between a pair of lateral platforms;
    extending hydraulically the pair of lateral platforms from a retracted position to an extended position;
    elevating hydraulically the drill floor to a drilling height;
    coupling a mudboat to the preassembled substructure;
    receiving by the mudboat a mast dolly supporting a mast and raising the mast to be supported by the elevated drill floor using a pair of mast ramps.

12. The method of claim 11, further comprising coupling a plurality of hydraulic walking shoes to the preassembled substructure, each hydraulic walking shoe disposed proximate one of the plurality of legs and being actuated by the integrated hydraulic power unit.

13. The method of claim 11, further comprising:
    coupling drawworks to the preassembled substructure; and
    coupling a driller cabin to the elevated drill floor.

* * * * *